Feb. 23, 1943.  F. E. JOHNSON  2,311,759
COFFEE MAKING DEVICE
Filed July 8, 1940
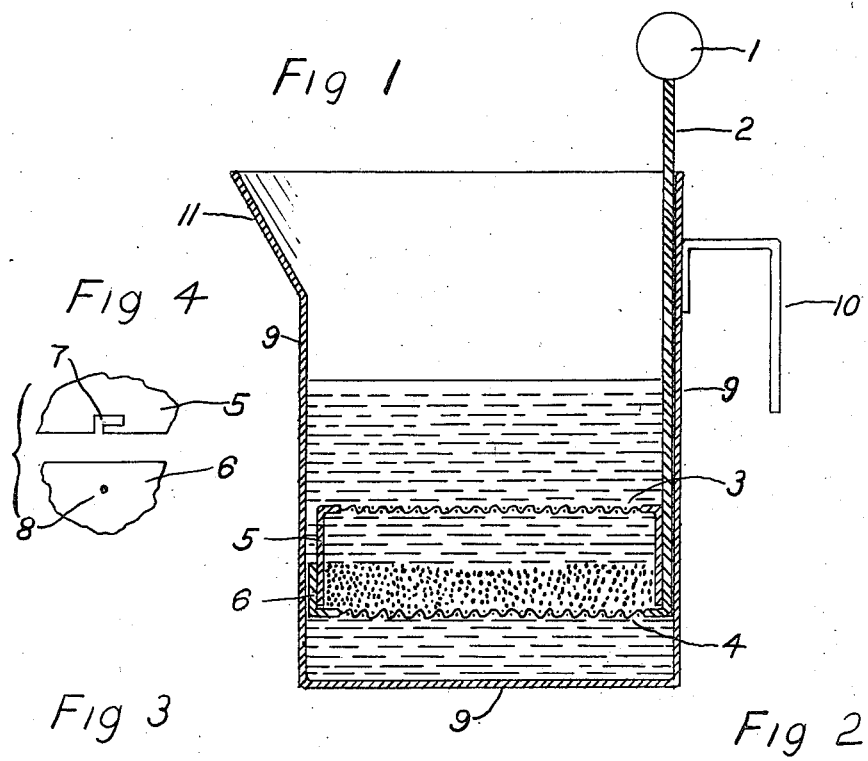
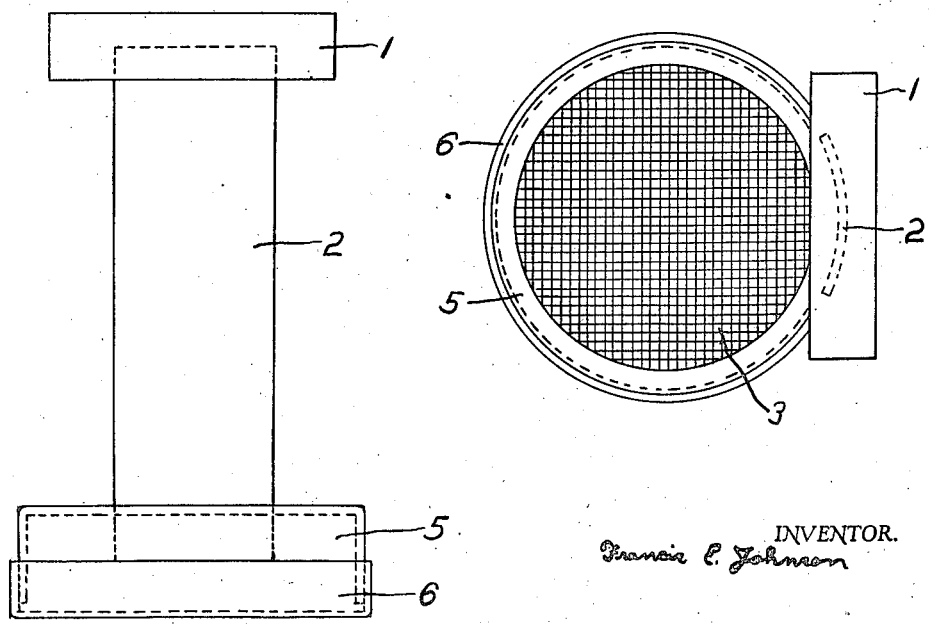
INVENTOR.
Francis E. Johnson Patented Feb. 23, 1943

2,311,759

UNITED STATES PATENT OFFICE 2,311,759

COFFEE MAKING DEVICE

Francis E. Johnson, Mount Vernon, N. Y.

Application July 8, 1940, Serial No. 344,348

4 Claims. (Cl. 53—3)

This invention relates to coffee making or other beverage making devices using an external source of power to contact, combine and separate the ground coffee or like beverage making substance and liquid and has for its principal object the construction of a device of the character described: which is efficient in extracting the desirable soluble substances, which permits minimum oxidation, which extracts minimum of the undesirable substances, simple to operate, easy to clean and capable of giving a consistently good beverage.

This invention has for a still further object the provision of an improved device of the character described where liquid is caused to pass in opposite directions as often as desired through a mass of ground coffee or like beverage making substance, held in an inner container closed on all sides having filter ends. More particularly this invention proposes an arrangement where ground coffee or like beverage making substance is placed in a removable closed hollow piston, retainer or basket adapted to be either reciprocated, oscillated or given any predetermined motion in an outer container to cause liquid contained in said outer container to pass in opposite directions through a mass of ground coffee or like beverage making substance contained in said piston, retainer or basket to produce a beverage. The said piston, retainer or basket is closed on the side and is provided with two filters and a means by which said piston, retainer or basket may be moved to cause liquid contained in said outer container to pass in opposite directions through a mass of ground coffee or like beverage making substance contained in said piston, retainer or basket.

An embodiment of my invention is illustrated in the accompanying drawing in which—

Figure 1 is a vertical sectional view of the coffee making or other beverage making device.

Figure 2 is a top view of the hollow piston or basket.

Figure 3 is a vertical view of the hollow piston or basket.

Figure 4 is a view of a method for securing the cover.

The coffee making device as shown in the drawing is comprised of a cylindric container 9 adapted for making and holding liquid coffee or like beverages provided with a handle 10 and a pouring spout 11, and a hollow piston or basket closed on the sides adapted to telescope into the container 9, provided with a top filter 3, a bottom filter 4 and a closure 5. The closure 5 is adapted to telescope the hollow piston or basket 6 and is secured to the said hollow piston or basket 6 by a bayonet slot 7 on said closure 5 and lug 8 on said hollow piston or basket 6 by a rotary movement of one of the said parts. The said hollow piston or basket 6 is provided with a handle supporting member 2 to which is attached a heat insulating handle 1 by means of which the said hollow piston or basket 6 may be alternately raised and lowered.

When a high force for operation is not objectionable the hollow piston or basket 6 may have a water tight fit with the container 9 and when a low force for operating is desirous the hollow piston or basket 6 may have a loose fit with the container 9 so unnecessary friction will be eliminated when the piston or basket is reciprocated, but preferably not so loose that liquid surface tension of the liquid with the filter will not be readily broken when the piston or basket 6 is reciprocated with ground coffee in the said hollow piston and liquid in said container or not so loose that a substantial quantity of the liquid in said container 9 will not pass back and forth through the ground coffee in the said piston or basket 6 when said piston or basket 6 be reciprocated, or alternately raised and lowered. The dimensional limitations of the piston or basket 6 and the container 9 should be such that the piston or basket 6 is large enough with respect to the container 9 that the surface tension of the liquid with the filter and the ground coffee or like beverage making substance will be readily broken when the said piston or basket 6 is reciprocated with liquid in the said container 9 and ground coffee or like beverage making substance in the said hollow piston or basket 6, and small enough with respect to the container 9 that undue friction with the container 9 will be eliminated when the said piston or basket is reciprocated, or alternately raised and lowered.

It is preferable that the filter material used for the piston or basket be of wire cloth, cloth material, material, or combination of materials capable of withstanding the plunger action of the filter with the liquid in the container, and it is preferable that the total hole area of the filter take up a high percent of the area of the filter, or be highly porous. It is preferable that the mesh of the filter be substantially fine or be porous. It is preferable that the filters of the said piston or basket be capable of retaining a high percent of the sediment or that the container be provided with a filter. It is preferable that the filters of the said piston or basket be substantially rigid so that the surface tension of the liquid and the filter will be more readily broken and so the filter will not cling to the outer container when the piston or basket be reciprocated.

The container and the basket may be of any suitable shape so adapted for each other that when the basket is reciprocated in one shape, oscillated in a second shape, moved back and forth in a third shape, raised and lowered in a fourth shape or given any predetermined motion in other possible shapes that a substantial quantity of the liquid in the container will pass back and forth through the basket, piston or retainer. The dimensional limitations of the basket and the container should be such that the clearance of the said basket be small enough with respect to the said container that the surface tension of the water on the filters will be readily broken, when the basket is given the said predetermined motion and the said clearance great enough that undue friction will be eliminated. The device may be made so that the basket is held stationary, with the outer container adapted to be moved so as to cause liquid contained therein to pass back and forth through the basket. The means by which the container or basket is moved in respect to each other may be attached at any convenient place best adapted to the special shape or design. The container or basket may be adapted to be moved by a motor.

To make beverage place a measured quantity of cold liquid in the container and heat to the desired temperature, or place a measured quantity of hot liquid in the container, then place a measured quantity of ground coffee or like beverage-making substance in the said basket, then cause the said basket to be given the said predetermined motion in respect to the container until the liquid is of the desired strength. The beverage may be served immediately or allowed to simmer. The basket may be removed or allowed to remain in the container.

Having thus described my invention what I claim is:

1. A coffee making device comprising a cylindrical container having a cylindrical plunger therein substantially engaging the side walls of the pot and guided thereby, the said plunger being of a size and shape to receive a charge of coffee and be separable to provide access to its interior, both upper and lower end walls of said plunger being of a filtering material, and the cylindrical wall imperforate, and a handle firmly attached to the periphery of said plunger and extending upwardly in the direction of the axis and wholly confined within the cylindrical surface.

2. A device in accordance with claim 1 in which the handle extends upwardly substantially parallel to the axis, and above the top of the pot.

3. A device in accordance with claim 1, in which the relative diameters of the interior of the pot and of the plunger are such that undue friction will be eliminated and the clearance will be small enough so that the surface tension of the water on the filter will be broken by the pressure so liquid can be made to pass in both directions through the basket, and the said handle is adapted to reciprocate the said basket.

4. A basket for use with a cylindrical coffee pot comprising a hollow plunger adapted to engage and be guided by the walls of the coffee pot, the said plunger being of a size and shape to receive a charge of coffee and being separable to provide access to its interior, both upper and lower end walls of said plunger being of a filtering material, and the cylindrical wall being imperforate, and a handle firmly attached to the periphery of said plunger and extending upwardly in the direction of the axis and wholly confined within the cylindrical surface.

FRANCIS E. JOHNSON.